United States Patent [19]

Sugimoto

[11] 4,037,431
[45] July 26, 1977

[54] COUPLING DEVICE USED IN ONE-WAY ROTATING DRIVE

[75] Inventor: Takao Sugimoto, Akashi, Japan

[73] Assignee: Kawasaki Jukogyo Kabushiki Kaisha, Kobe, Japan

[21] Appl. No.: 687,813

[22] Filed: May 19, 1976

[30] Foreign Application Priority Data

May 20, 1975   Japan .............................. 50-67951[U]

[51] Int. Cl.² .............................................. F16D 3/64
[52] U.S. Cl. ......................................... 64/14; 64/11 R
[58] Field of Search .............................. 64/14, 9, 11 R; 192/106.1, 55

[56] References Cited

U.S. PATENT DOCUMENTS

| | | | |
|---|---|---|---|
| 2,397,642 | 4/1946 | Blazek et al. | 192/106.1 |
| 3,106,076 | 10/1963 | Bastow | 64/14 |
| 3,638,454 | 2/1972 | Croset | 64/14 |
| 3,940,947 | 3/1976 | Ahlen | 64/14 |

Primary Examiner—Samuel Scott
Assistant Examiner—Randall Heald
Attorney, Agent, or Firm—Sughrue, Rothwell, Mion, Zinn and Macpeak

[57] ABSTRACT

A coupling device for transmitting rotational torque in only one direction from a drive member to a driven member has first and second flange members and an elastic circular compression member. The compression member has projections on the periphery which are grabbed by claws on the flange members. There are several pairs of claws, one claw of each pair being attached to the first flange and the other claw being attached to the second flange. The first and second flanges are connected to the drive and driven members, respectively. As the drive member rotates in its only rotating direction, torque is transmitted between the paired claws via the elastic projections between the paired claws. The elastic member also has smaller projections which extend between the claws of adjacent pairs and are therefor free of compression during rotation.

2 Claims, 3 Drawing Figures

U.S. Patent  July 26, 1977  4,037,431

COUPLING DEVICE USED IN ONE-WAY ROTATING DRIVE

BACKGROUND OF THE INVENTION

1. Field of the Invention

This invention relates to a coupling device, and more particularly to a coupling device used in one-way rotating drive for transmitting the rotation (revolution) of a drive shaft to a driven shaft.

2. Description of the Prior Art

Rotational coupling devices are usually designed to permit transmission of clockwise and counter-clockwise torque between a drive member and a driven member. As a result the design features must be balanced for both directions of rotation. Some devices, e.g., sport equipment such as jet skiis, do not require two-direction rotational coupling devices. Consequently when one examines conventional rotational couplers from the viewpoint of only a single required rotating direction, there are several features which appear undesireable.

A conventional two-direction rotational coupler is shown in vertical cross section in FIG. 3. The coupler comprises a first flange (not shown) attached to the drive member and having claws 3 extending therefrom in an axial direction to a second flange (not shown). The second flange is connected to the driven member and has claws 4 extending therfrom toward the first flange. In between the flange faces there is an elastic circular member 8 having a thickness slightly greater than the projecting lengths of the claws from the respective flange faces. Thus, when the coupling member is assembled the claws from the flanges will almost, but not quite reach the opposite flange face.

The elastic circular member 8 has projections 5, 5' around the periphery thereof.

When the drive member rotates in the clockwise direction, as seen in FIG. 3, the clockwise torque is transmitted from claws 3 to the claws 4 via the projections 5. The projections 5 will thus be compressed by torque variation and the projections 5' will be essentially free. For counter clockwise rotation the torque will be transmitted via projections 5', which will be compressed between claws 3 and 4.

Because of the requirement for two-directional coupling, half the volume and weight of the elastic projections are free during torque transmission. Also the claws are concave on both sides thereof to permit compression in both directions and the projections are shaped to have a large heavy head and a narrow neck.

SUMMARY OF THE INVENTION

If we view the coupling member from the viewpoint that only single direction coupling is required, the latter features are disadvantageous. For example during rotation only about half the projections of elastic member contributes to the transmission of rotational torque. As the r.p.m. increase the shape of the free elastic projections results in a large centrifugal force on said projections. This force acts against a very narrow neck portion and tends to break the free projections at the neck. Thus there is a limit to the r.p.m. permitted for the coupling. Additionally, the size of the elastic member projections limits the number of claw pairs which can be used.

It is therefore a main object of the present invention to provide an improved coupling device which permits increased transmission torque as well as increased permissible r.p.m.

According to the invention, the free projections of the elastic member are relatively small, rectangular in cross-section, and take up a relatively small portion of the total volume and weight of all projections. Consequently, the claws need have concave surfaces on only one side and can be made smaller, and more pairs of claws can be used in the same size coupling device.

DESCRIPTION OF THE PREFERRED EMBODIMENTS

Figure 1:
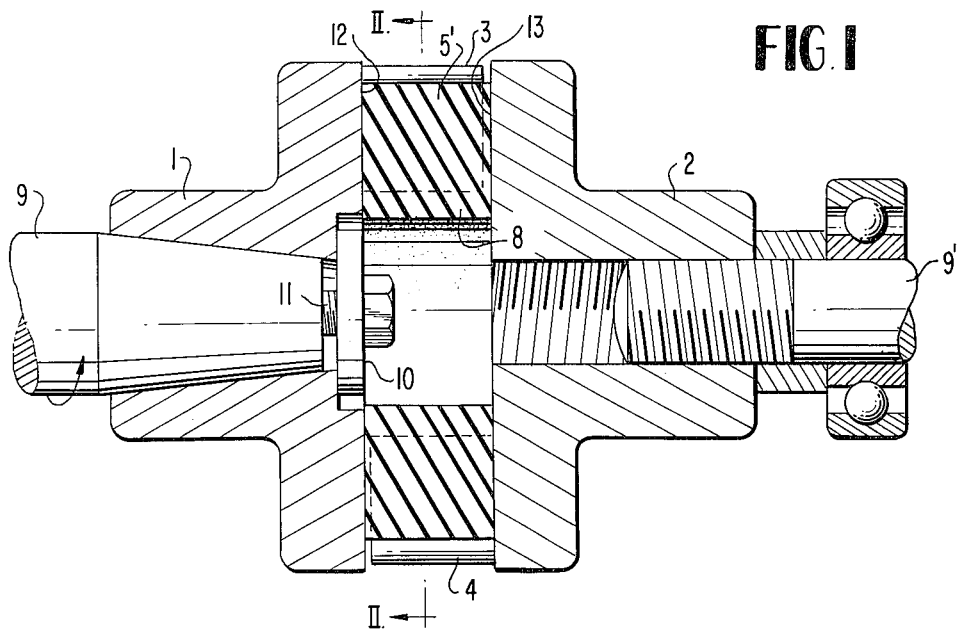
FIG. 1 is a cross-sectional view of a coupling device of the present invention.

Referring to FIG. 1, numeral 1 denotes a first flange which is engaged with a drive (transmission) shaft 9 by means of a bolt 11 through a washer 10. Numeral 2 denotes a second flange provided on the side of a driven shaft 9' and having on its center portion a screw hole for engaging with the driven shaft 9'. Six pairs of claw members 3, 4 project from respective surfaces 12 and 13 of the flanges 1 and 2 along the axis of the drive shaft and are radially arranged at constant intervals. Claws 3 project from face 12 of flange 1 and claws 4 project from face 13 of flange 2, and all claws are provided in such a manner that the free end of each claw member fixed to one flange nearly contacts to the other.

Figure 2:
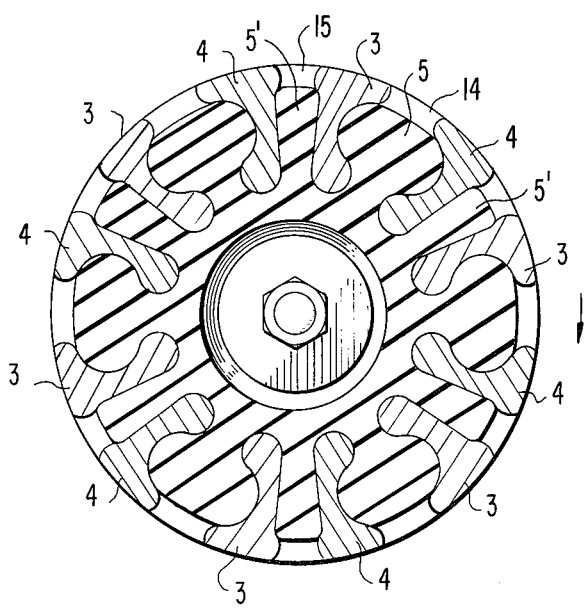
FIG. 2 is a vertical section of the embodiment of the invention taken on line II—II in FIG. 1.
Figure 3:
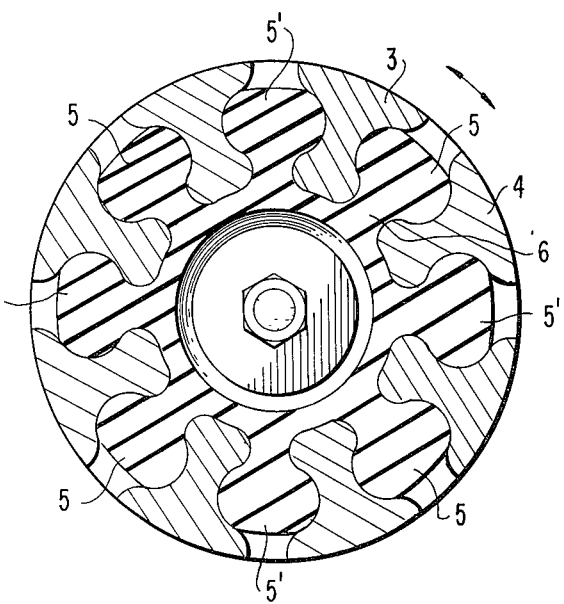
FIG. 3 is a vertical section of a conventional coupling device.

Numeral 8 is an elastic circular member composed of an elastic material such as rubber. On its periphery, there are provided oval projections 5 having an oval cross-section and projections 5' having a rectangular cross-section, which, as shown in FIG. 2, are alternately arranged and integrally formed as part of said elastic member.

Each relatively large oval shaped projection 5 is positioned between two claws 3, 4 comprising a pair of claws. The claws 3, 4 are generally L-shaped and have concave portions facing projections 5.

In operation, when the rotating torque in the clockwise direction, as shown by the arrow in FIG. 1, is transmitted from the drive shaft 9 to the driven shaft 9', each claw member 3 transmits torque to its paired claw member 4 through a projection 5, which controls the compression force. The torque variation caused thereby is absorbed by means of projection 5.

As can be seen, the present device has projections 5 with the same shape on the compression side as that of the conventional device. However, the free projections 5' are reactangular in cross-section and are light in weight, therby reducing the centrifugal force acting on the projections 5'. Accordingly, with the present invention the centrifugal force acting on the projections 5' will not be as great as in the conventional device and there is less chance of breakage. Thus greater r.p.m. is permissible. Further, since the projections 5' are constructed smaller than those of the conventional device, the number of projections can be increased. Thus greater transmission torque is permissible.

What is claimed is:

1. In a coupling device for use in a one-way rotating-drive arrangement, said coupling device being of the type which is composed of a pair of flanges connected to a drive shaft and to a driven shaft respectively, the improvement comprising; at least two pair of claw members, each pair consisting of one claw projecting along the drive shaft axis from one of the flanges and a second claw projecting along the drive shaft axis from the other of said flanges, each said claw member having generally an L-shape with the concave portion facing its paired claw member; and an elastic circular member, having first and second group of radial projections alternately provided on its periphery, mounted between said flanges, each of said first group of radial projections having two convex surfaces mating with the concave surfaces of said pair of claw members, each of said second group of radial projections being substantially smaller and lighter and having a different shape than those of said first group.

2. In a coupling device as claimed in claim 1 wherein the radial projections in said second group are rectangular in cross section.

* * * * *